United States Patent [19]
Rosenlof et al.

[11] Patent Number: 5,812,692
[45] Date of Patent: *Sep. 22, 1998

[54] METHOD AND APPARATUS FOR DETECTING A MICROSCOPE SLIDE COVERSLIP

[75] Inventors: Mikel D. Rosenlof, Boulder, Colo.; Robert C. Schmidt, Redmond, Wash.; Shih-Jong J. Lee, Bellevue, Wash.; Chih-Chau L. Kuan, Redmond, Wash.

[73] Assignee: NeoPath, Inc., Redmond, Wash.

[*] Notice: The term of this patent shall not extend beyond the expiration date of Pat. No. 5,638,459.

[21] Appl. No.: 784,316

[22] Filed: Jan. 16, 1997

Related U.S. Application Data

[62] Division of Ser. No. 309,248, Sep. 20, 1994, Pat. No. 5,638,459.

[51] Int. Cl.⁶ ............................................. G06K 9/46
[52] U.S. Cl. ............................................. 382/133; 382/291
[58] Field of Search ................................. 382/128, 133, 382/193, 195, 202–204, 287, 291, 199

[56] References Cited

U.S. PATENT DOCUMENTS 5,072,382  12/1991  Kamentsky ..................... 364/413.08

Primary Examiner—Joseph Mancuso
Assistant Examiner—Larry J. Prikockis
Attorney, Agent, or Firm—Hans I. Sun; Emil Moffa

[57] ABSTRACT

Coverslip detection locating all four coverslip edges. A field of view processor receives image data from a charge coupled device camera. The charge coupled device camera images a slide and coverslip that is mounted on a movable frame. The slide and coverslip are illuminated from below with a uniform light source. The moveable frame is under computer control and moves in response to the field of view processor. The field of view processor locates the coverslip by first positioning the movable frame to view a portion of the slide on a predetermined potion of the slide within a predetermined area of the slide. The slide is then re-imaged after the movable frame moves the slide toward a chosen edge of direction. Edge type objects are located and followed over multiple fields of view. If the edge object satisfies a set of predetermined criteria the coverslip edge has been found. The edge is extended to find all four corners of the coverslip. The edge objects are processed using morphological operators.

29 Claims, 12 Drawing Sheets

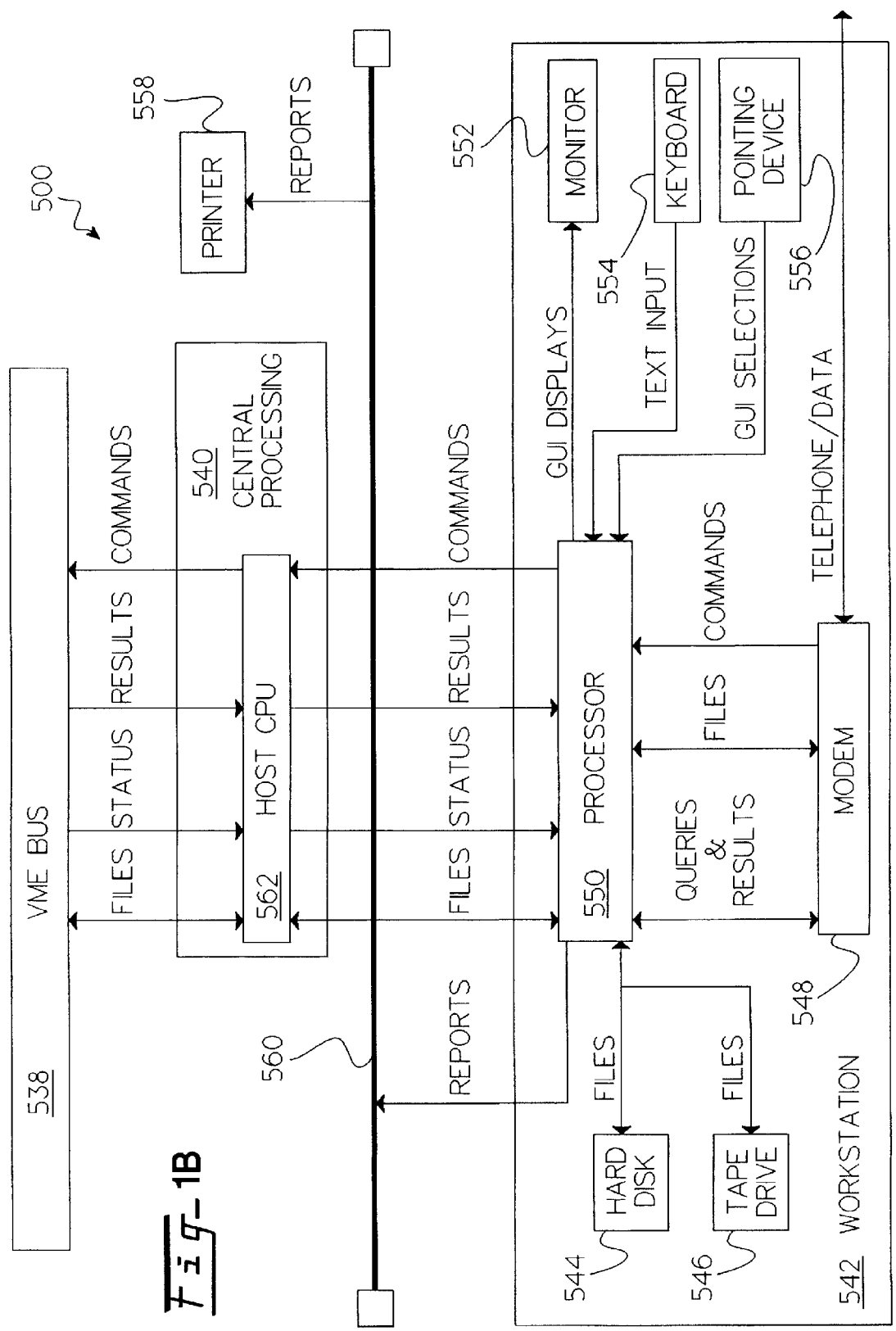

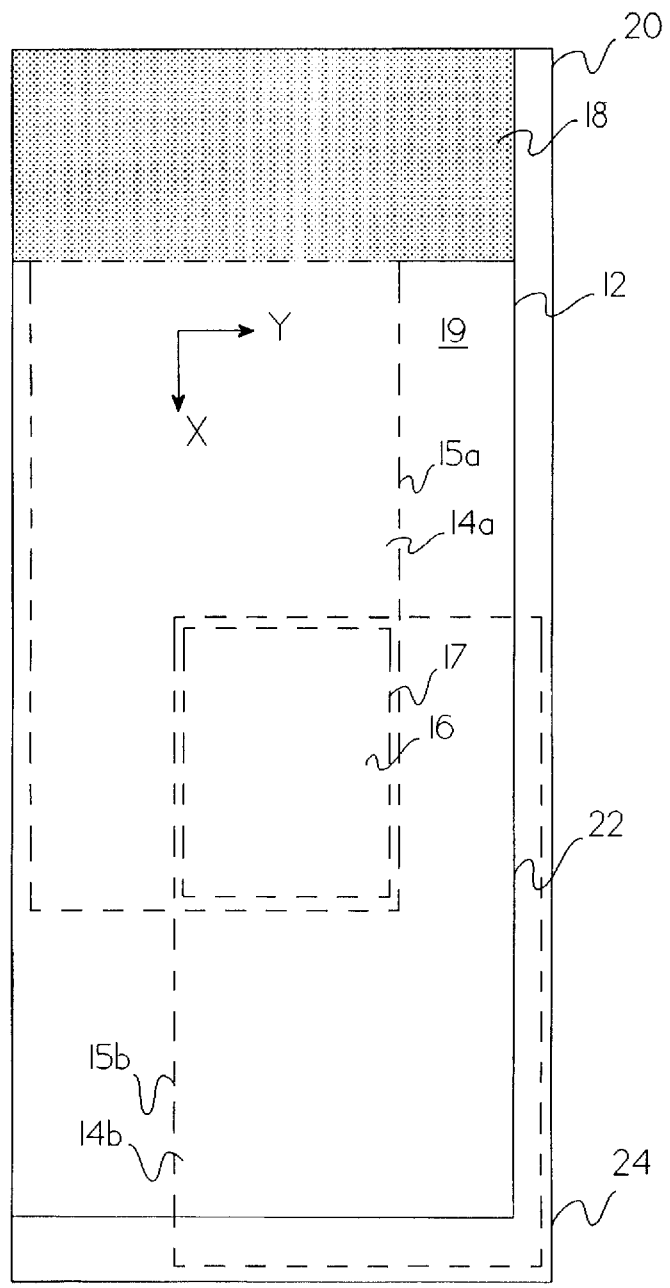
Fig_2

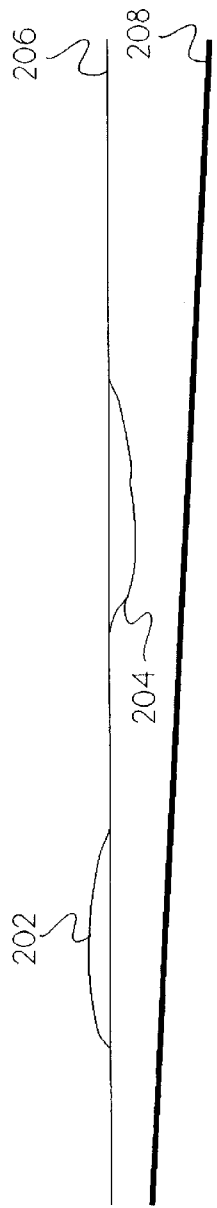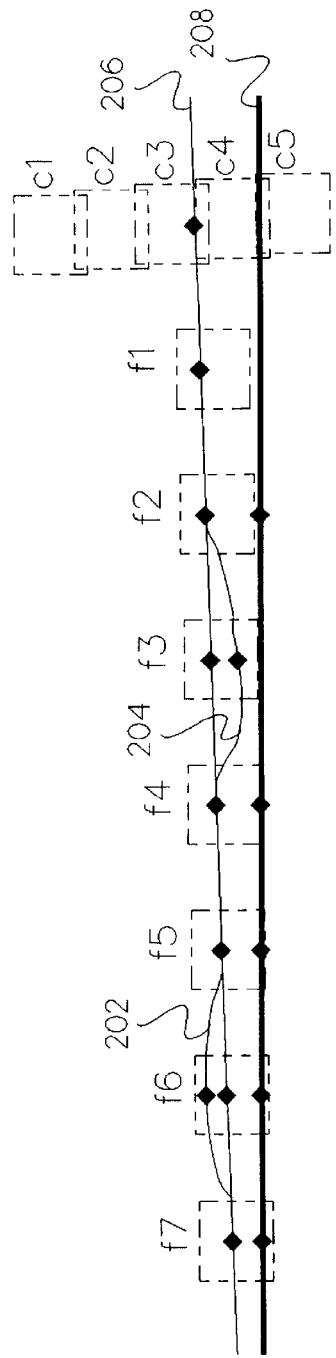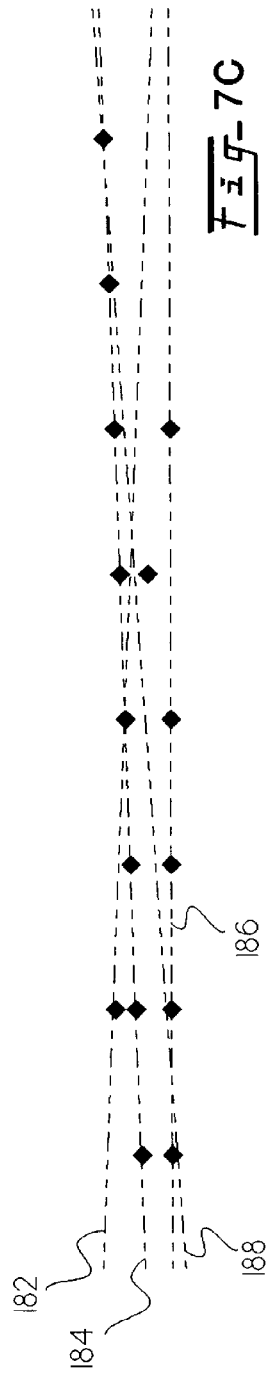

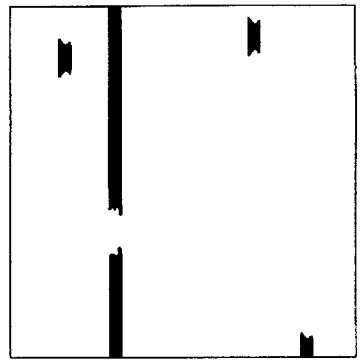
Fig_8A
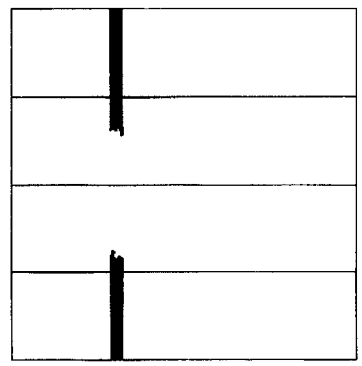
Fig_8B
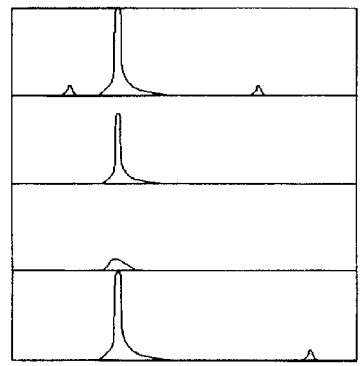
Fig_8C
0                           511
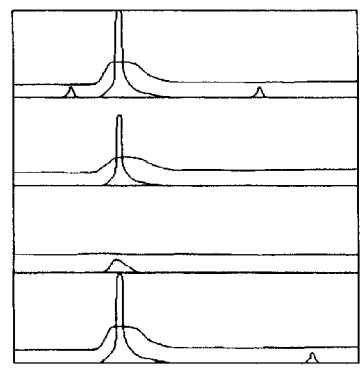
Fig_8D

METHOD AND APPARATUS FOR DETECTING A MICROSCOPE SLIDE COVERSLIP

This application is a division of application Ser. No. 08/309,248, filed Sep. 20, 1994, now U.S. Pat. No. 5,638,459.

FIELD OF THE INVENTION

This invention relates to an apparatus for detecting a microscope slide coverslip, and more particularly to a apparatus for determining the boundaries of a microscope slide coverslip prior to processing of images of areas under the coverslip.

BACKGROUND OF THE INVENTION

Automated cytology systems such as the NeoPath Autopap 300 (TM) automated cytology system available from NeoPath Corporation of Bellevue, Wash. analyze an image of a biological specimen for evidence of objects such as squamous intraepithelial lesions and cancerous cells. The biological specimen is typically fixed to a microscope slide where the microscope slide includes a coverslip over the biological specimen. It is advantageous to detect the microscope slide coverslip prior to the analysis of the biological specimen for a number of reasons. The image of the specimen is considered of highest quality, exhibiting regular and uniform optical properties only if it is contained under the coverslip. When applied, the coverslip position is invariant with respect to the sample, and, as a result, the coverslip may be used as a fiducial optical element for locating specific objects in the sample.

In automated cytology systems, microscope objective lenses are designed to image specimens under a coverslip of consistent thickness. Thus, images acquired from any biological specimens not lying under the coverslip lack the proper optical properties necessary for high quality image analysis. Therefore, the location of the coverslip must be detected with a very high degree of certainty, or the entire slide may be rejected as unsatisfactory for analysis.

In some imaging applications the coverslip may span more than one field of view. Traditional edge detection techniques do not address the analysis of a small number of partial edges for reconstruction of a coverslip object spanning multiple fields of view.

In the prior art, locating a coverslip by its edges has proven to be difficult for several reasons. For example, coverslips are typically applied by hand, as a result, the quantity of adhesive used tends to vary from slide to slide. In some cases the adhesive does not reach the edge of the coverslip and voids are created in the adhesive. The edges of the voids may appear much like coverslip edges. In other cases, the adhesive may ooze out from under the coverslip causing dirt to collect on the adhesive which results in the optical properties around the edge changing.

In addition, the specimen may have structures that, in some cases, resemble edges. Such structures may degrade or prevent the successful location of the coverslip.

In a typical slide the coverslip and adhesive ranges in size from about 0.10 mm to 0.14 mm thick. The average coverslip with adhesive is approximately 0.12 mm thick. The slide is approximately 1.0 mm thick. The differences in thickness between the slide and the coverslip lead to the slide forming a much stronger edge image which tends to overwhelm the image formed by the coverslip edge when magnified by the microscope.

Traditional edge detection techniques also have difficulty in differentiating transition areas from slide edges. For example, microscope specimens typically have an opaque label attached at one end of a slide. The transition area between the opaque label and the transparent slide creates a very strong edge image. Traditional edge detection techniques often detect this strong edge image better than the weaker images of the edges of the coverslip.

Since the position of a coverslip may vary, it is necessary to accurately locate the coverslip on each slide before a slide specimen can be analyzed. For acceptable results, analysis must take place more than a predetermined distance away from the coverslip edges. Further still, data may only be considered valid if it is acquired from under the coverslip.

Further, since slide analysis requires that a data plane of material on the slide be measured at a number of positions, a map is usually developed to estimate correct focus positions. Because a microscope objective lens is typically corrected for spherical aberrations associated with a particular coverslip and adhesive thickness, focus positions are only meaningful if focused through the coverslip and adhesive. Therefore, focus map positions must be measured through the coverslip.

Further still, corners of the coverslip may be used as fiducial marks for defining a coordinate system to locate objects on the slide. An error even as small as one degree in calculating the angle of the edge line, from the center of a 60 mm coverslip yields an error at the coverslip extreme of 0.52 mm. Therefore, a high degree of accuracy and repeatability is necessary to define coordinates which are useful for precisely locating such objects. It is one motivation of the invention to provide an apparatus to locate a microscope slide coverslip spanning multiple fields of view to provide a longer basis for more accurately determining the coverslip position.

SUMMARY OF THE INVENTION

The invention provides a coverslip detection apparatus that locates all four coverslip edges. The apparatus of the invention comprises a field of view processor coupled to receive image data from a charge coupled device camera. The camera views a slide and coverslip that is mounted on a movable frame. The slide is illuminated with a uniform light source. The moveable frame is controlled by a computer in response to the host computer. The host locates the coverslip by first positioning the movable frame to view a portion of the slide within a predetermined area of the slide. The slide is then reimaged after the movable frame moves the slide toward a chosen edge of direction. Edge objects are located and followed over multiple fields of view. If an edge object satisfies a set of criteria, the coverslip edge has been found.

In one preferred embodiment of the invention, the detected edge is no more than 0.318 mm away from the physical edge so that the measurements of the data surface for developing a focus map are taken entirely from data under the coverslip.

In one aspect of the invention, the position and orientation of a large object is accurately located with a very small number of images processed. The edges are located very quickly and reliably.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B, 1C, 1D and 1E schematically illustrate the slide imaging apparatus of the invention.

FIG. 2 shows a schematic of a microscope slide in a slide receptacle with the smallest standard coverslip installed at two positional extremes.

FIGS. 7A, 7B and 7C show edge fit methods used to determine a true edge.

FIGS. 8A, 8B, 8C, 8D, 8E and 8F show examples of filtered projection results.

DETAILED DESCRIPTION OF THE PREFERRED EMBODIMENT

Figure 1A:
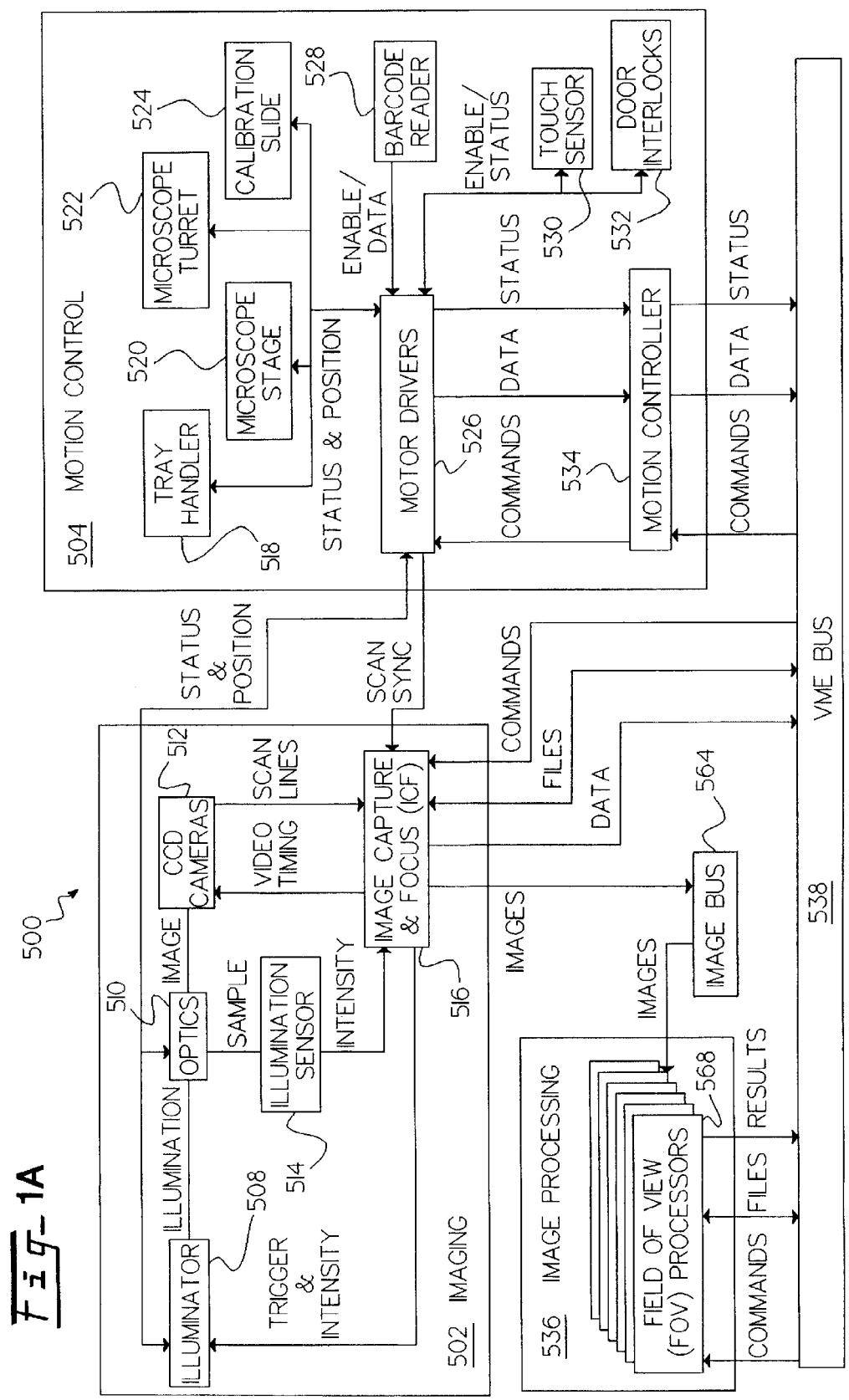

In a presently preferred embodiment of the invention, the system disclosed herein is used in a system for analyzing cervical pap smears, such as that shown and disclosed in allowed U.S. patent application Ser. No. 08/571,686, for which the issue fee has been paid, filed Dec. 13, 1995, to Nelson et al., entitled "Method For Identifying Normal Biomedical Specimens" which is a file wrapper continuation of abandoned U.S. patent application Ser. No. 07/838,064; U.S. Pat. No. 5,528,703, issued Jun. 18, 1996 to Lee et al., entitled "Method For Identifying Objects Using Data Processing Techniques", which is a file wrapper continuation of abandoned U.S. patent application Ser. No. 07/838,395, filed Feb. 18, 1992; U.S. Pat. No. 5,315,700, issued May 24, 1994, to Johnston et al., entitled "Method And Apparatus For Rapidly Processing Data Sequences"; U.S. Pat. No. 5,361,140, issued Nov. 1, 1994, to Hayenga et al., entitled "Method and Apparatus for Dynamic Correction of Microscopic Image Signals"; allowed U.S. patent application Ser. No. 08/302,355, for which the issue fee has been paid, filed Sep. 7, 1994 entitled "Method and Apparatus for Rapid Capture of Focused Microscopic Images" to Hayenga et al., which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 unless otherwise noted, and which are all hereby incorporated by reference including allowed U.S. patent application Ser. No. 08/309,118, for which the issue fee has been paid, to Kuan et al. entitled, "Field Prioritization Apparatus and Method"; pending U.S. patent application Ser. No. 08/927,379, filed Sep. 12, 1997, to Wilhelm et al., entitled "Apparatus for Automated Identification of Cell Groupings on a Biological Specimen", which is a file wrapper continuation of abandoned U.S. patent application Ser. No. 08/309,061; pending U.S. patent application Ser. No. 08/969,970, filed Nov. 13, 1997, to Meyer et al. entitled "Apparatus for Automated Identification of Thick Cell Groupings on a Biological Specimen", which is a file wrapper continuation of abandoned U.S. patent application Ser. No. 08/309,116; allowed U.S. patent application Ser. No. 08/667,292, filed Jun. 20, 1996, for which the issue fee has been paid, to Lee et al. entitled "Biological Analysis System Self Calibration Apparatus", which is a file wrapper continuation of abandoned U.S. patent application Ser. No. 08/309,115; pending U.S. patent application Ser. No. 08/678,124, filed Jul. 11, 1996, to Lee et al. entitled "Apparatus for Identification and Integration of Multiple Cell Patterns", which is a file wrapper continuation of abandoned U.S. patent application Ser. No. 08/308,992; U.S. Pat. No. 5,627,908, issued May 6, 1997 to Lee et al. entitled "A Method for Cytological System Dynamic Normalization"; U.S. Pat. No. 5,566,249, issued Oct. 15, 1996 to Rosenlof et al. entitled "Apparatus for Detecting Bubbles in Coverslip Adhesive"; pending U.S. patent application Ser. No. 08/867,017, filed Jun. 3, 1997, to Lee et al. entitled "Cytological Slide Scoring Apparatus", which is a file wrapper continuation of abandoned U.S. patent application Ser. No. 08/309,931; U.S. Pat. No. 5,692,066, issued Nov. 25, 1997, to Lee et al. entitled "Method and Apparatus for Image Plane Modulation Pattern Recognition"; pending U.S. patent application Ser. No. 08/309,250 to Lee et al. entitled "Apparatus for the Identification of Free-Lying Cells"; U.S. Pat. No. 5,740,269, issued Apr. 14, 1998, to Oh et al. entitled "A Method and Apparatus for Robust Biological Specimen Classification"; U.S. Pat. No. 5,715,327, issued Feb. 3, 1998, to Wilhelm et al. entitled "Method and Apparatus for Detection of Unsuitable Conditions for Automated Cytology Scoring".

It is to be understood that the various processes described herein may be implemented in software suitable for running on a digital processor. The software may be embedded, for example, in the central processor 540.

Figure 1C:
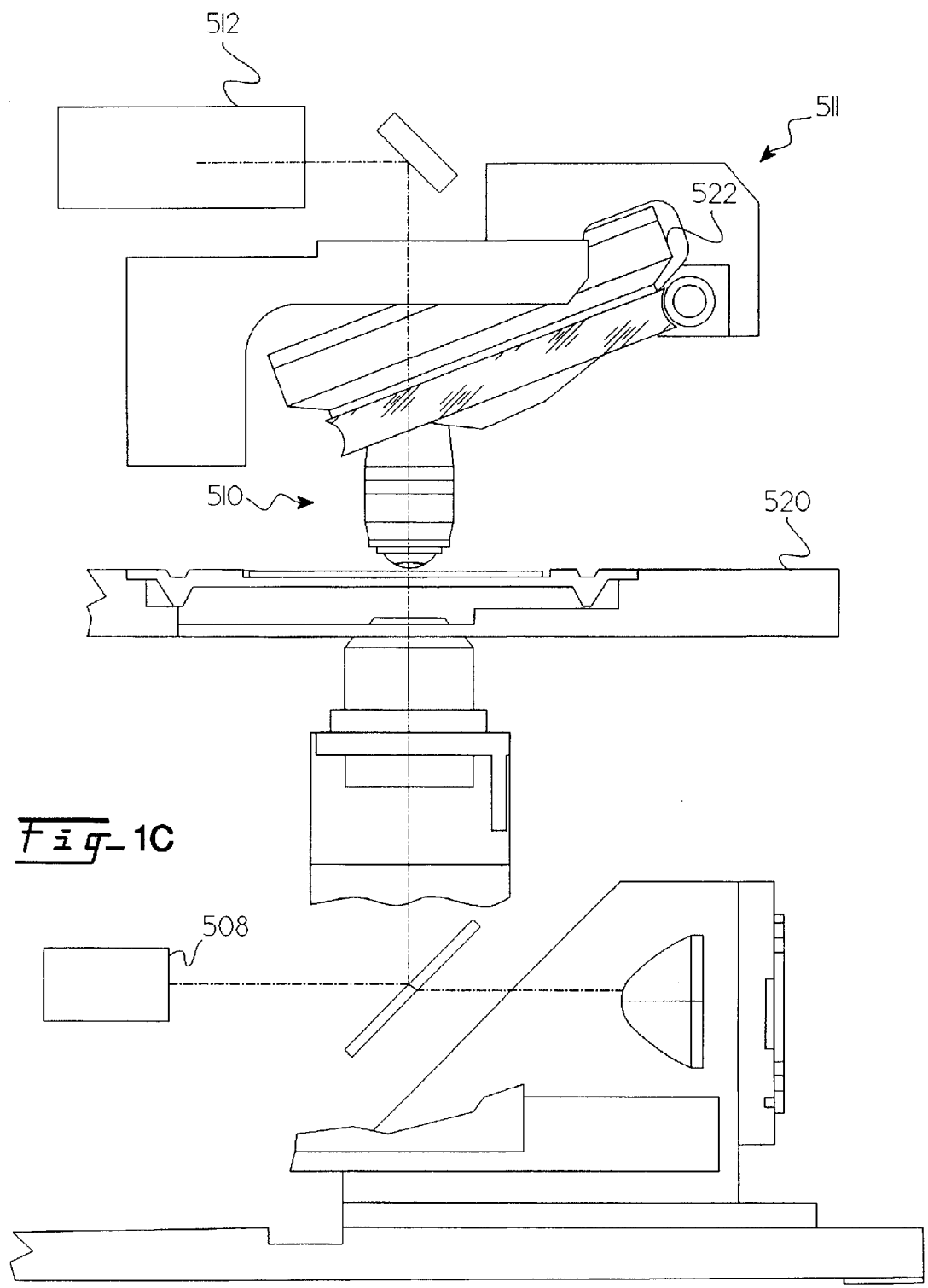

Now refer to FIGS. 1A, 1B and 1C which show a schematic diagram of one embodiment of the apparatus of the invention for field of view prioritization. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field of view processors 568. The images are sent along the image bus 564 from the image capture and focus system 516. A central processor 540 controls the operation of the invention through the VME bus 538. In one embodiment the central processor 562 comprises a MOTOROLA 68030 (TM) CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation if the doors are open. Motion controller 534 controls the motor drivers 526 in response to the central processor 540. An Ethernet (TM) communication system 560 communicates to a workstation 542 to provide control of the system. A hard disk 544 is controlled by workstation 550. In one embodiment, workstation 550 may comprise a SUN SPARC CLASSIC (TM) workstation. A tape drive 546 is connected to the workstation 550 as well as a modem 548, a monitor 552, a keyboard 554, and a mouse pointing device 556. A printer 558 is connected to the Ethernet (TM) communication system 560.

During coverslip detection, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

Figure 1D:
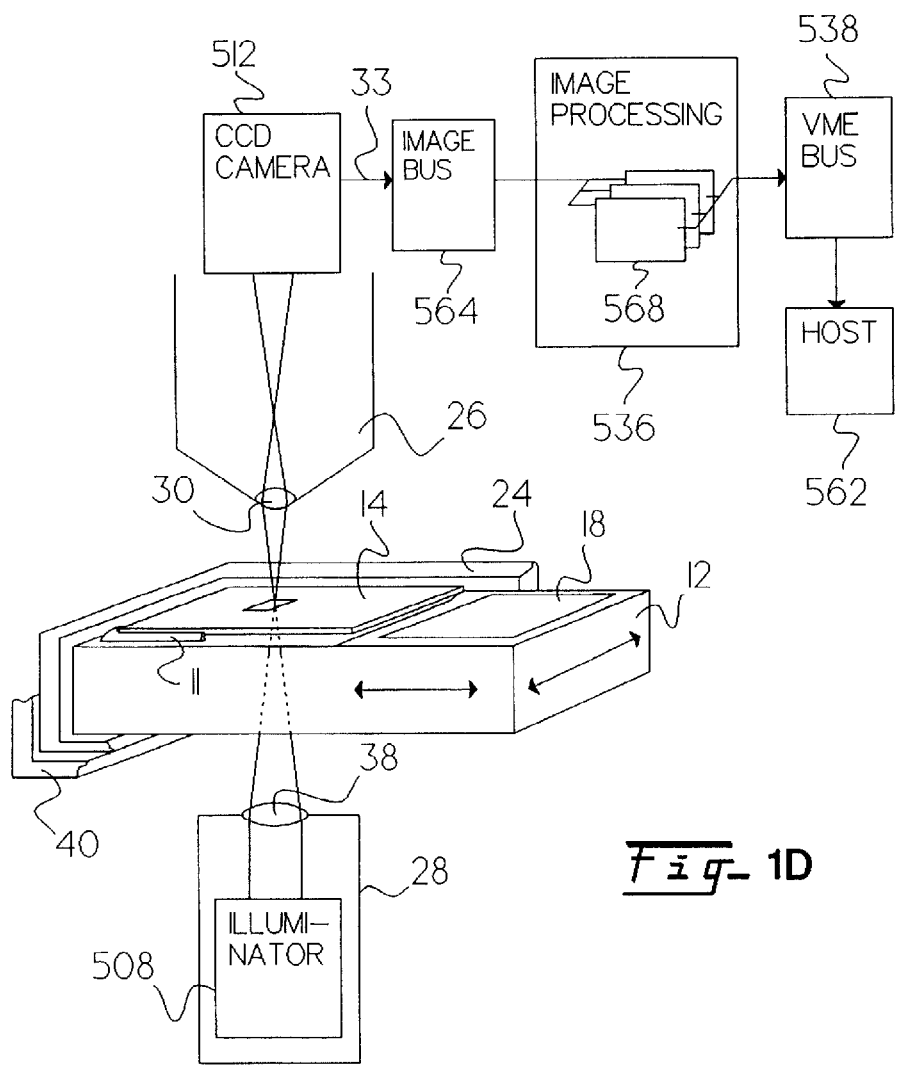
Figure 1E:
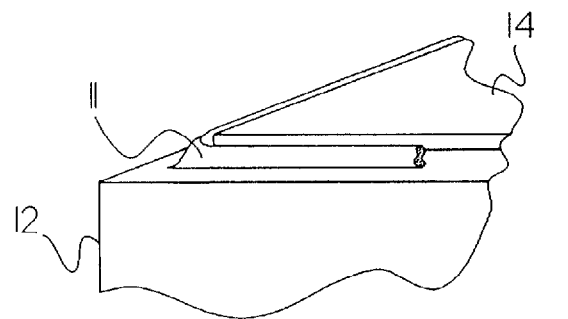

Referring now to FIGS. 1D and 1E which show schematics of the coverslip detection apparatus of the invention. The coverslip detection apparatus comprises a computer and image acquisition system comprising a host computer 568. The host computer 568 runs a real time operating system that controls the operation of the remainder of the system comprising a microscope 26 with a xenon strobe 508 for illumination, a processor 536 to acquire and digitize images from the microscope 26, a computer controlled microscope stage 40 to position the specimen under the microscope objective 30, and from one to 15 Field Of View (FOV) processors 568 which receive images under control of the host computer and from the image acquisition processor 536. The FOV processors 568 perform image processing and object classification operations on the images and transmit the results to the host computer.

FIG. 1E shows an expanded view of one corner of a microscope slide 12 covered by cover slip 14. The adhesive 11 bonds the cover slip 14 to the slide.

FIG. 2 shows an example slide 12 in slide receiving receptacle 20. Slide 12 is a typical specimen glass slide having two general areas, the label area 18, which may comprise, for example, frosted glass largely covered by an opaque label, and the transparent specimen area 19. A glass cover slip 14 is shown here in two locations. Slide location 14a and slide location 14b are examples of cover slip placement showing placement on the light transmissive portion 19 of slide 12. The slide location 14a shows the location of the coverslip in the upper-left-most extreme in relation to FIG. 2. The slide location 14b shows the coverslip in the bottom-right-most extreme position. A window region indicated by 16 and outlined by a border 17 is the region of the slide receptacle 20 whereby due to physical restriction of the slide mount, there must always exist a coverslip. The slide 12 may be positioned anywhere within the limits of the slide receptacle 20 from the upper left hand corner of slide receptacle 20 to the bottom right hand corner. Regardless of the location of the slide 12 with respect to the slide receptacle 20, window region 16 provides a window where the coverslip will always be found. The invention exploits this condition by starting the search for the coverslip edge within the window region 16.

In the following descriptions, width refers to a dimension in X, and height refers to a dimension in Y on a conventional Cartesian coordinate system when viewing a slide shown in a top view, such as in FIG. 2.

On the slide receiving receptacle 20, the slide 12 position may vary within a rectangle of dimensions stageWidth by stageHeight. Where stageWidth represents a measure of the space for the slide within the receiving receptacle 20 and stageHeight represents a similar spatial measure the height of the space for the slide within the receiving receptacle 20. A portion of the slide 12 is designated the label area 18 which may not be covered by any portion of the coverslip 14a, 14b. The label area spans the height of the slide 12 and has a width defined as labelWidth from the left edge of the slide 12. A coverslip 14a, 14b has minimum dimensions of coverslipWidth by coverslipHeight, and may be adhered to any point on the slide 12 such that no part of the coverslip extends beyond the slide edge, and no part of the coverslip extends into the label area. It follows that coverslipWidth is a parameter measuring the cover slip width and coverslipHeight is a parameter measuring the cover slip height.

Given the stage limits and the minimum coverslip size, the region 16 that must be covered by the coverslip may be computed. The rightmost position of the left edge, maxLeft is calculated as $$maxLeft = stageWidth - coverslipWidth.$$

The leftmost position of the right edge, minRight, is calculated as $$minRight = labelWidth + coverslipWidth.$$

The limits for the topmost value of the bottom coverslip edge, minTop, and the bottom-most position, maxBottom, of the top coverslip edge are similarly calculated $$maxBottom = stageHeight - coverslipHeight$$

$$minTop = coverslipHeight.$$

The region bounded by maxLeft and minRight in the X axis and maxBottom and minTop in the Y axis must fall under the coverslip. Similarly, an outer bound for the coverslip area exists defined by the parameters minLeft, maxRight, minBottom, and maxTop which are defined in the following equations.

$$minLeft = labelWidth$$

$$maxRight = stageWidth$$

$$minBottom = 0$$

$$maxTop = stageHeight.$$

Thus, to search for a particular edge of the coverslip, a search begins inside the region 16 which must be covered by the coverslip, proceeds in a direction orthogonal to the edge in question in one embodiment, and ends outside the coverslip outer bound area.

The apparatus of the invention includes a tray 24 that may hold at least one slide, but preferably a number of slides. In one example of the invention, tray 24 holds up to eight slides in position for moving about under the microscope lens 30. The tray 24 includes receptacle 20 where receptacle 20 includes an opening suitably sized to accept a standard range of slide sizes and where the opening may be advantageously large enough to facilitate insertion and removal of the slides. In one example of the invention receptacle is sized to accommodate slide positions that may vary by as much as 2 millimeters about the X and Y axes relative to the receptacle 20. Also, since the coverslip 14 applied to the slide 12 is smaller than the slide 12, the coverslip position relative to the slide edges 22 may vary. This variation depends on both the slide size and the coverslip size. The total variation in the coverslip position is the sum of the variation of the coverslip position on the slide 12 and the variation of the slide position in the tray 24.

The total variation is significant because, in certain applications, the optical system 28 for illuminating the specimen requires that the area illuminated be clear of obstructions for 0.318 mm from the edge of any field imaged. Coverslip edges, because of their effect on illumination, are considered obstructions. Those skilled in the art will recognize that as coverslip thicknesses and slide thicknesses vary, so will the size of the area that must be clear of obstructions.

Because the coverslip 14 is permanently attached to the slide 12, the corners of the coverslip 14 may be used as fiducial marks to define a coordinate system for each slide. A coordinate system based on the coverslip corners is invariant with respect to translation and rotation of the slide. Therefore, an object located in a coordinate system based on the coverslip corners may still be found if the slide is removed from the slide tray and replaced, or moved around in the tray. The slide may even be moved to a different type of microscope, provided that the different type of microscope can be used to accurately locate the same coverslip corners, and that the coverslip has not moved relative to the slide.

One embodiment of a coverslip edge detection process as contemplated by the invention comprises two sub-processes. A first sub-process, called Edge Detection FOV Processing, is performed on the image processing computers to analyze one image per FOV acquired from the microscope and determine if an edge exists or not. A second sub-process, called FOV Processing Result Collection and Analysis, directs a searching pattern, collects the individual image results from the image processing computers, and analyzes the collected data to determine the edge positions and direct additional searches.

Figure 3:
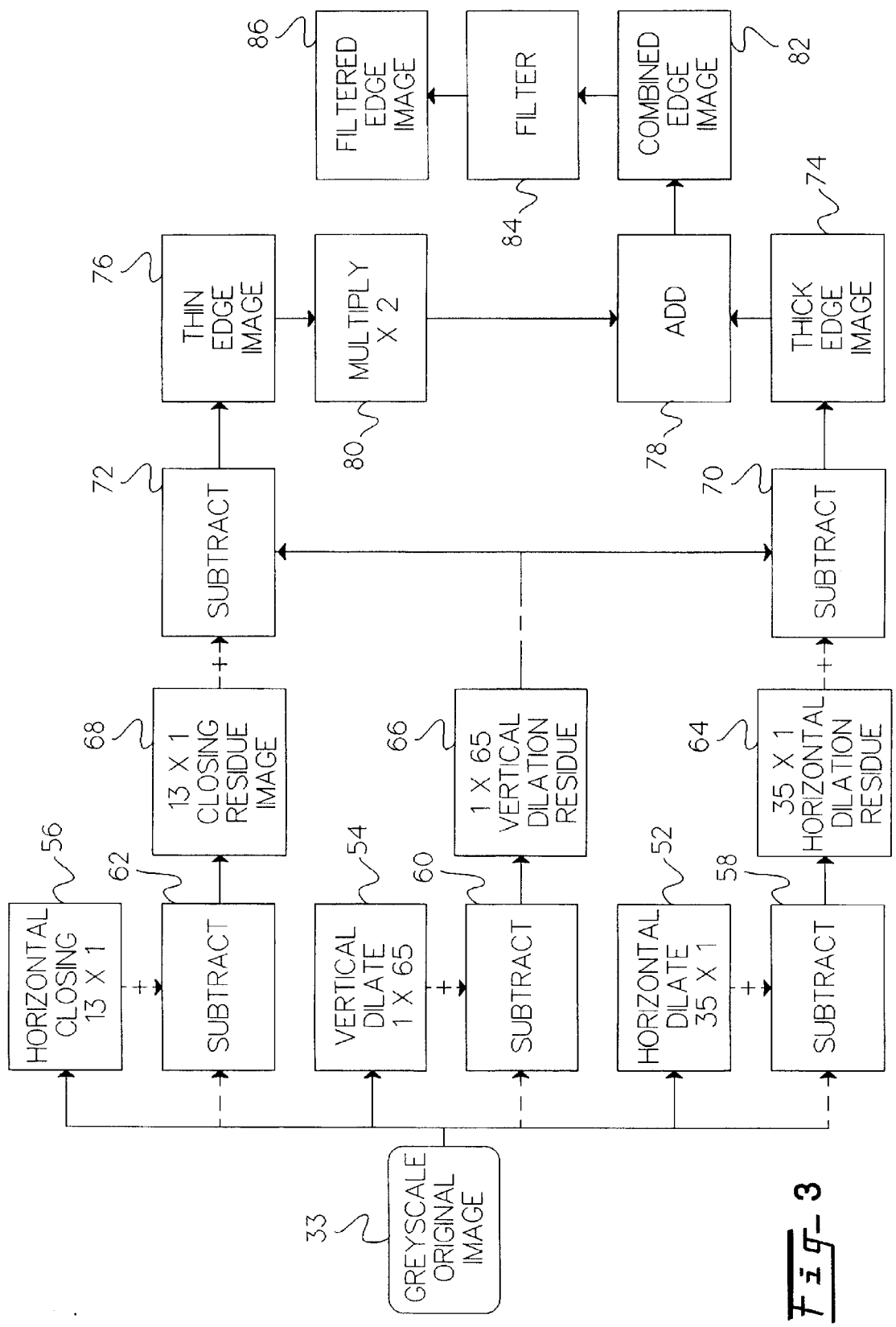
FIG. 3 shows a schematic diagram of processing used to detect the field of view edge.

Referring now to FIG. 3, a schematic diagram of processing used to detect the field of view edge is shown. An edge detection FOV processor, which may be one of the FOV processors 568, receives one image as acquired from the microscope with a low power objective, such as a 4× objective. In one embodiment of the invention, an image comprises 512×512 pixels, with each pixel having a size of 2.75 microns square, yielding an image size of 1.408 millimeters square. It will be understood that the size of the image may vary depending upon the type of equipment used and the invention is not considered to be limited to the specific parameters of this illustrative example.

Image preparation uses several input parameters passed from the host computer 568, including queue location, edge search orientation (that is, horizontal or vertical orientation) and left or right edge position prioritization and normalizes the image 33. Normalization comprises the steps of orienting the image 33 to search in a vertical direction only and positioning the image in a predetermined image buffer for the image processing step. Horizontal edges are searched for by rotating the image 90 degrees and searching in the vertical direction.

As described in more detail below with regard to the steps of FIG. 3, the image processing operation accepts the original image in gray scale, enhances vertically oriented edges, and removes any falsely detected artifacts in the image 33, thereby improving the signal to noise ratio of the edge objects.

Perform successive openings 84 using structuring elements with successively larger vertical length and unit width. Filter out any objects without substantial contiguous vertical energy.

The original gray scale image 33 is horizontally dilated in step 52. It is also vertically dilated in step 54 and a horizontal closing is performed on it in step 56. The output of the horizontal dilation step 52 may be subtracted from the original gray scale image in step 58 to provide a 35×1 horizontal dilation residue image 64. The output of the vertical dilation step 54 is subtracted from the original image, step 60, to produce a 1×65 vertical dilation residue in the image at step 66. The output of the 13×1 horizontal closing step 56 is subtracted from the original image, step 62, to produce a 13×1 closing residue image 68. At step 72, the 13×1 closing residue image 68 is subtracted from the 1×65 vertical dilation residue image to produce a thin edge image 76. At step 70, the 35×1 horizontal dilation residue image 64 is subtracted from the 1×65 vertical dilation residue image 66 to produce a thick edge image 74. The thin edge image 76 is multiplied by two, step 80, and added to the thick edge image in step 78 to produce a combined edge image 82. The combined edge image is filtered with the process outlined in FIG. 4 to produce a filtered edge image 86.

The projection method of the invention determines whether there are edges in an image from the filtered edge image 86. The image is divided into a number of different images. In one example the image is divide into 4 horizonal regions. This enables the adaption the method to local image contrast. Each region has different filtered thresholds. Multiple views allows the invention to process skew edges. For example, given a skew edge crossing 4 fields of view, ¼ of the edge will span each field of view, becoming an object hit. These hits may be correlated into one skew edge in the final step of the project process of the invention resulting in a very robust method. The correlation steps process broken edge images as well.

Figure 8E:
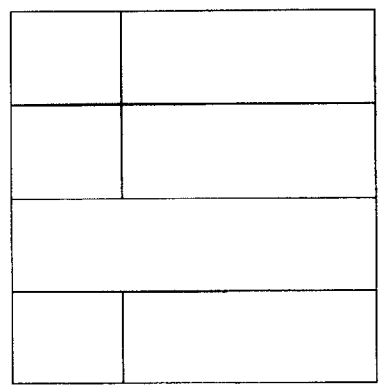
Figure 8F:
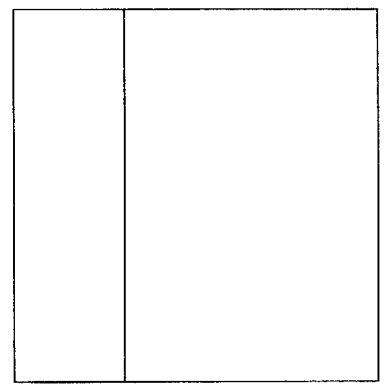

Now refer to FIGS. 8A, 8B, 8C, 8D, 8E and 8F which show the processing of a filtered edge image. FIG. 8A shows a filtered edge image. FIG. 8B shows the image divided into 4 equal horizontal regions where a vertical projection of pixels in each region has been performed. The sum of the pixel values of each column region has been computed. FIG. 8C shows the results of projecting each region. Higher values indicate more vertical edge energy. A low pass filter is performed on each project result curve. FIG. 8D shows curves that are the low pass results. The curves serve as thresholds to determine object hits in each region. FIG. 8E shows the object hits as detected. They might not be continuous due to poor image quality, improper focus or non-ideal image processing. FIG. 8F shows the edge detected as the object hits correlate to meet the minimum error criteria.

Figure 4:
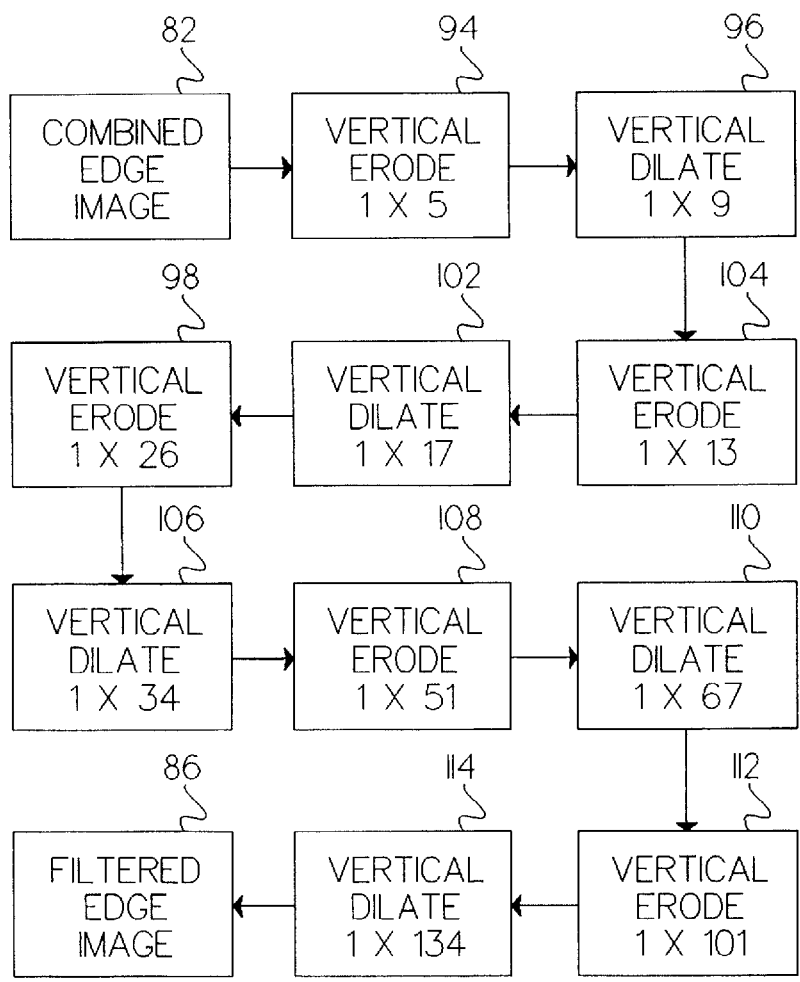
FIG. 4 shows a schematic of processing required to image the edge with a filter.

Now refer to FIG. 4 where a schematic of processing which is required to image the edge with a filter is shown. The combined edge image 82 is vertically eroded in a 1×5 vertical erode step 94, then vertically dilated in a 1×9 vertical dilate step 96. The image is then vertically eroded again in a 1×13 vertical erode step 104 and vertically dilated again in a 1×17 vertical dilate step 102. It is subsequently vertically eroded again in a 1×26 vertical erode step 98 and vertically dilated in a 1×36 vertical dilate step 106. Another vertical erosion in 1×51 vertical erosion step 108 is followed by a vertical dilation step in 1×67 vertical dilate step 110 again, respectively. The image is then vertically dilated again in 1×101 vertical erode step 112 and vertically dilated in 1×134 vertical dilate step 114, each with larger and larger structuring elements. The processed output is a filtered edge image 86.

Once the image is enhanced by the above-described process such that the remaining image has only objects of substantial vertical energy, the image may be substantially equally divided horizontally into four regions and the detected edge intensity may be projected onto these regions. Each region is equal in width to the image and represents the projection of one fourth of the edge intensity. The edge intensity projection comprises the summation of pixels in the vertical direction within the region. Objects with greater vertical energy sum to larger numbers than objects with less vertical energy. The object projection values are lowpass filtered in one direction and thresholded. Each occurrence of the region projection exceeding the filtered thresholded projection is called an object hit.

The invention locates edges with the goal of rejecting no slide with a correctly applied coverslip. Practical use required a false rejection rate of no more than two or three percent. FIGS. 8A, 8B, 8C, 8D, 8E and 8F show examples of edges that have been detected as object hits.

The object hits from each group are analyzed for their correlation to a perfect vertical line. Potential edges are made up of one object hit from each region. Qualifications for an edge include a minimum of 3 region hits, i.e. the potential edge must span three regions or three quarters of the image. The span need not include contiguous regions.

Yaw (rotation) of the objects must not vary from the vertical by more than 10 degrees. Line segment correlation preferably meets a minimum error criterion. If the points being considered meet the above criteria, then an edge is considered to be detected and the image pixel position for the edge is saved and returned.

In one useful embodiment of the invention, a maximum of three edges that satisfy the correlation criteria are returned to the host. If more than three edges are present, one additional direction input to the FOV processing determines the position (leftmost or rightmost) of the three edges returned.

The slide coordinate system is specified with the long edge of the slide as the X axis, and the short side as the Y axis. A label region of the slide, typically with frosted glass, is placed to the left, so the positive X axis points away from the label, and the positive Y axis points upward.

Edges are referred to as the left edge-the vertical edge with the smaller X value the right edge-the vertical edge with the larger X value the bottom edge-the horizontal edge with the smaller Y value and the top edge-the horizontal edge with the larger Y value. The intersection of the bottom and left slide edges is the origin of the coordinate system.

Figure 5:
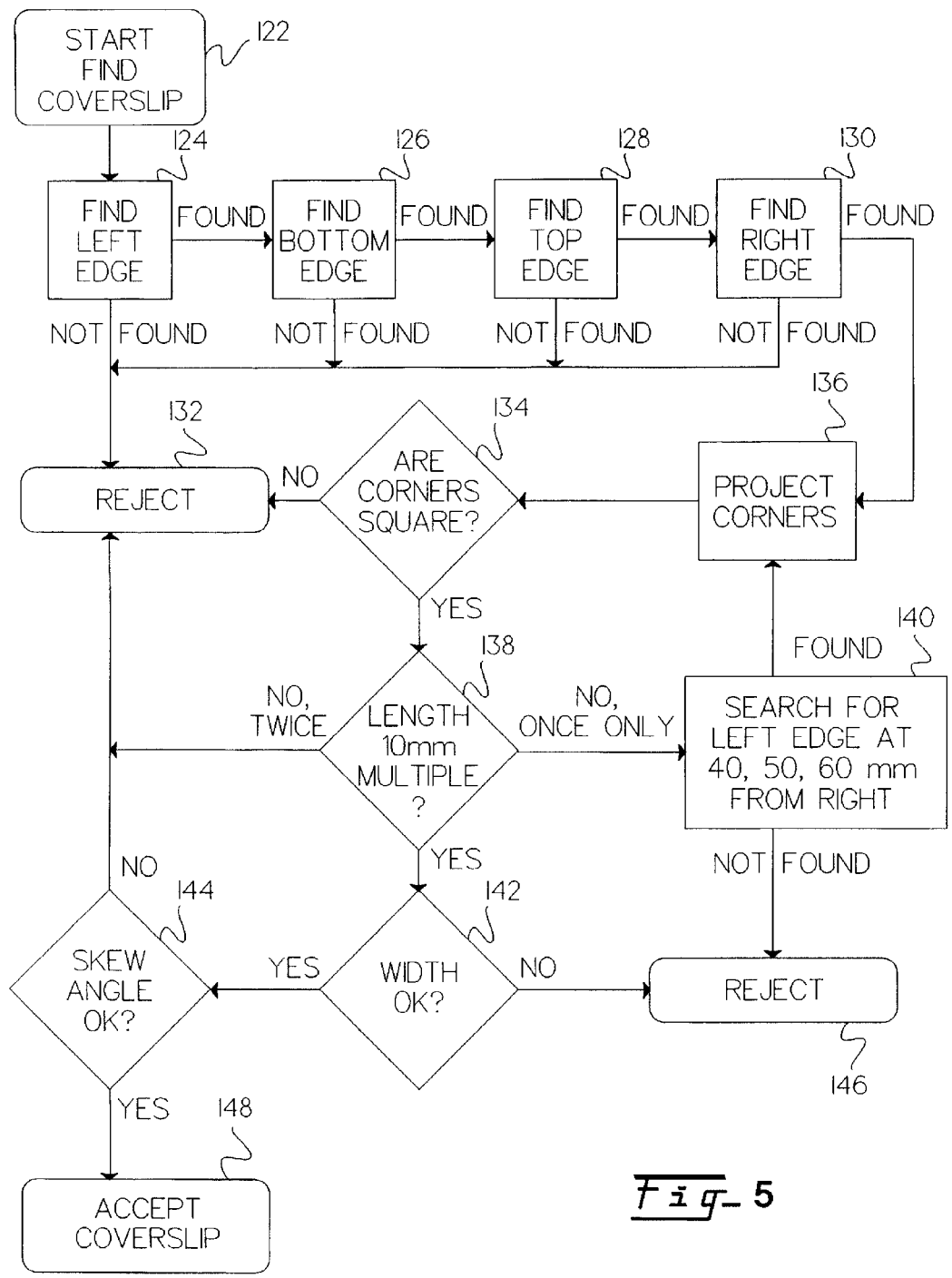
FIG. 5 shows a coverslip detection flowchart.
Figure 6:
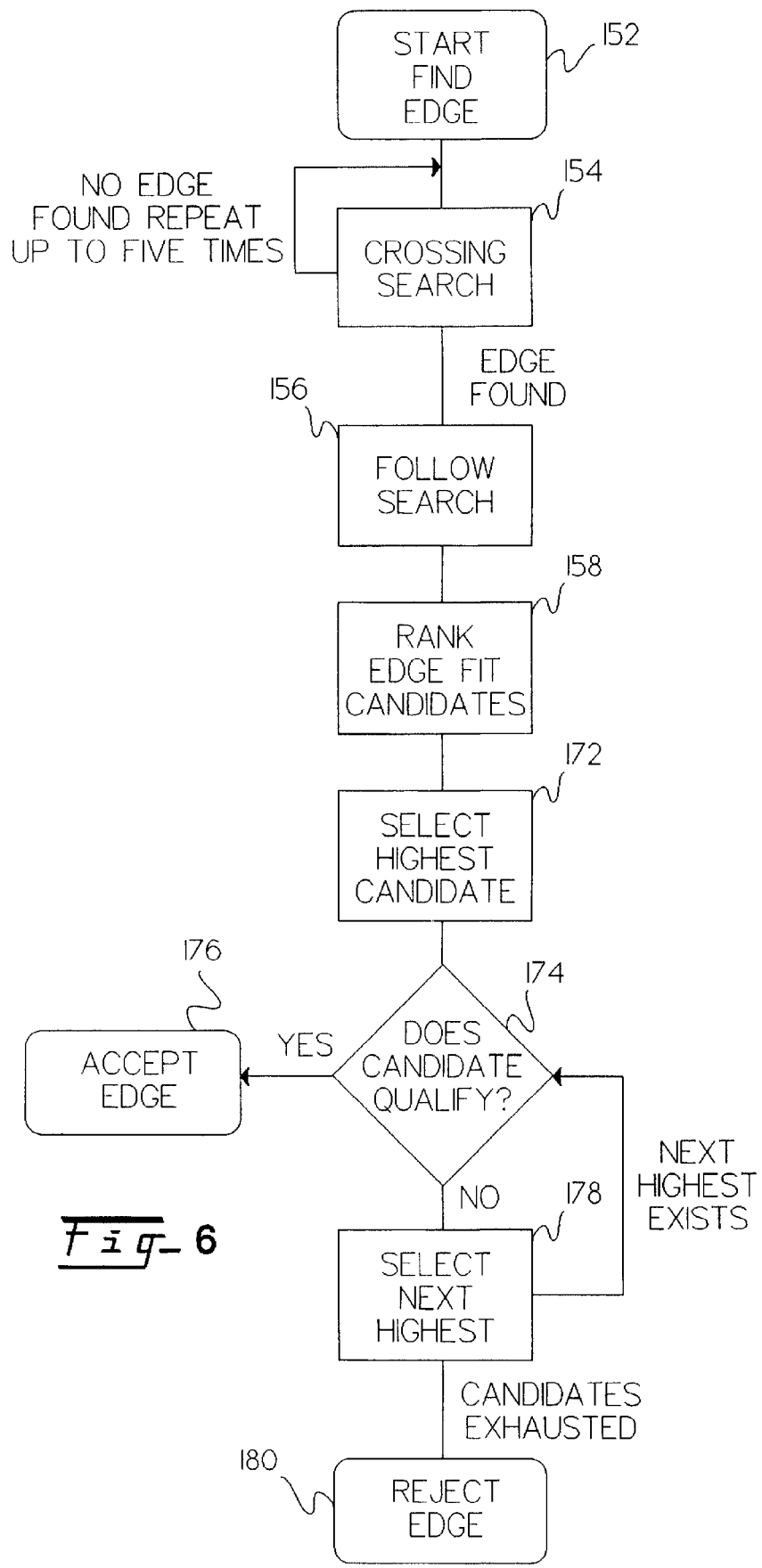
FIG. 6 shows a method of accepting or rejecting an edge.

Now referring jointly to FIG. 5 and FIG. 6 which illustrate that the search for a particular coverslip edge is divided into a series of scans. Briefly summarized, a scan comprises the steps of specifying a starting point, a direction, a spacing to the automated microscope image acquisition and processing system, and a count of images to acquire. Also specified is the type of edge to look for horizontal or vertical. The image collection and processing system acquires images, and returns the positions of the edges detected within each image.

Edges are searched in the order of left, step 124, bottom, step 126, top, step 128, then right, step 130. Failing to find any one edge aborts any attempt to locate edges later in the list in step 132.

The search for a particular edge begins with a scan orthogonal to the edge in question. This scan is called a crossing search step 154. The crossing search starts inside the area which must be covered by the coverslip region 16, with a spacing of 75 percent of the width of one image acquired from the microscope. If the bottom or top edge is the target of the search, a horizontal edge is expected, a vertical edge is expected for the left and right edge searches.

If an edge is detected in one or more of the fields processed from the crossing scan, 154, a following search 156 is performed. The following search 156 begins centered at the point where the edge was detected, the direction is parallel to the edge in question, the spacing and count are chosen to give enough edge detections to ensure a good edge fit, and to not search outside the area that has been calculated to be within the coverslip.

Now refer to FIG. 5 which shows one example of a coverslip detection method of the invention. The coverslip detection process starts with step 122. The process first tries to find the left edge of the coverslip in step 124. If the left edge is found, the process proceeds to find the bottom edge in step 126. If the left edge is not found the process flows to the reject step 132 where the specimen is rejected. If the bottom edge is found in step 126 the process flows to step 128 to find the top edge. If the top edge is found, the process flows to step 130 to find the right edge. If the bottom, top, or right edge is not found the processes all flow to step 132. If in step 130 the right edge is found, the process flows to step 136 to project the corners of the coverslip. The process flows to step 134 to determine whether the corners are square. In step 134, after edges are detected, the detected edges are validated to ensure that true edges have been found. The coverslip corners are projected by calculating the intersection of adjacent edge pairs. These intersection points are used in some of the following evaluations. A coverslip is rectangular, with 90 degree corners, so the angle between adjacent edges is compared against a pre-defined standard. If a corner angle is outside the standard, the slide 12 is rejected for analysis as unable to locate the coverslip. If in step 134 the corners are determined not to be square then the slide is rejected in step 132.

If the corners are determined to be square the process flows to step 138 to determine whether the lengths are multiples of 10 mm.

Coverslips are typically manufactured with a width that is a multiple of 10 mm. The width of the detected coverslip is compared to 40, 50, and 60 mm within a pre-defined tolerance in step 140. If the width is outside the tolerance at all of these widths, one more search is made to attempt to find the true edge.

Experience shows that the left edge that is near the label portion of the slide is the edge most likely to be missed or detected as an edge by this process. Therefore, the right edge is assumed to be correct, and a follow search 156 is performed at positions 40, 50, and 60 mm from the right edge. If such an edge is found, the coverslip corner angles are evaluated again, as are the following criteria. This retry search is performed only one time. The technique of assuming one edge position is true and looking for the opposite edge at fixed distances could be extended to all four edges, but practice up to now has not shown a need to do this. If they are not multiples of 10 mm the process searches for the left edge at 40 mm, 50 mm and 60 mm from the right in step 140. If the left edge is found the process returns to use the new data obtained in step 140 to project the corners again in step 136. The process is repeated once, step 134 and step 138 if in step 138 the lengths are 10 mm multiples the process flows to step 142 to determine whether the width of the coverslip is acceptable. If in step 138 the length is not found to be 10 mm or a multiple thereof after the process is repeated, the process flows to step 132. If in step 142 the width is acceptable the process flows to step 144 to determine if the skew angle is acceptable, and if the skew angle is acceptable in step 144 the process flows to 148 to report that the coverslip may be accepted. If the width is not acceptable in step 142 the process rejects the slide in 146. If in step 140 the search for a left edge at 40 mm, 50 mm and 60 mm from the right is unsuccessful, the process flows to step 146 to reject the slide.

Now referring to FIG. 6 which shows a detailed process flow for determining where an edge is while looking for the left, bottom, top or right edge. The process starts at step 152 to begin the edge finding process. The process flows to step 154 to perform a crossing search. If in step 154 an edge was found the process flows to the following search 156, if no edge was found the process searches up to five times until it finds an edge. If after five searches the process reports that the edge was not found, in step 154 a following search is preformed. In a following search the process flows to step 158 to rank edge fit candidates. The process then flows to step 172 to select the highest candidate. The process flows to step 174 to determine whether the highest candidate qualifies against a predetermined set of criteria. If the candidate does qualify the process flows to step 176 to report that the edge has been accepted. If the candidate does not qualify the process flows to step 178 to select the next highest candidate. If the next highest candidate does qualify, the process flows to step 176 again. If all the candidates have been exhausted, the process flows to step 180 to reject the edge.

Refer now to FIG. 7A which shows a cross section of one scan of the apparatus of the invention. A bubble edge 202 and an adhesive globule 204 is shown with the slide edge 208 and the coverslip edge 206. FIG. 7A shows what typically is found while imaging structures on a slide including a slide edge 208 next to a coverslip edge 206, and a globule of adhesive which extends beyond the coverslip.

FIG. 7B shows detected edge positions represented by diamonds, D. Images f1 through f7 represent a following search. Images c1 through c5 represent a crossing search. FIG. 7B shows a five image crossing search, and the location of the first detected edge from the crossing search. It also shows locations of images of a seven image following search and the edge detected within each image are indicated with a diamond symbol. The areas shown for the crossing search are offset slightly for clarity.

FIG. 7C schematically illustrates how the process of the invention determines four lines 182, 184, 186, and 188 that may be fit from combinations of the detected edges. The positions where edges are detected form a set of points on a Cartesian plane to which lines can be fit. Trial lines are fit using at most one edge from each image. The line fit minimizes the sum of the squared distance of the used points from the line in a conventional least squares linear fit. For each following search 156, a large number of lines may be fit which satisfy these criteria. Possible edge fits are evaluated by a process using at least four points to define the line. Total error of the difference of the measured position from the calculated position, normalized by the number of points, called pointcount, used in the fit must not exceed a predefined value.

$$\mathrm{SUM}(\mathrm{abs}(\mathrm{measured}_i-\mathrm{calculated}_i))/\mathrm{pointCount}$$

Lines with a smaller total error as defined in the equation above, are favored. Lines closer to the center of the coverslip are favored.

At most eight images may be processed in one following scan, and up to three edge hits are returned from the FOV processing. Combining points into all possible edge fits gives $3^8$ or 6,561 possible lines to fit, however, in practical use, the actual number is usually much smaller so that an exhaustive search of the combinations may be done in a reasonable time.

The edge fit criteria listed above with respect to FIG. 6 are in priority order. The search keeps data on the best edge found so far in step 158 and 172, and as a new candidate is evaluated checks each item on the list. The first two are absolute standards which must be met in step 174 for the candidate to be considered. The third item is used to select the line which gives the lowest total error. Selecting the line closest to the center of the coverslip is used as a tie breaker step 178.

Coverslips are typically manufactured with a height within a specific tolerance. If the detected coverslip height is outside this tolerance, the slide is rejected because it is not possible to locate the coverslip. Experience shows that height errors failures are much less common than width failures, so no retry search is implemented.

A coverslip may be affixed to a microscope slide so that the coverslip edges are not precisely parallel to the slide edges. The slide may also be placed in the tray so that the slide edges are not precisely aligned with the stage's coordinate system. The sum of these variations in placement yield a maximum angle that the coverslip may be rotated relative to the stage coordinate system. The detected coverslip orientation is determined by calculating the angle of the line from the lower left to lower right corner projection points. If this angle is outside a predetermined range, the slide is rejected for excessive coverslip skew.

The invention locates all four coverslip edges, with the detected edge no more than a specified distance inside the coverslip edge so that an adequate percentage of the sample under the coverslip is analyzed.

The method of the invention also locates edges with the goal of taking as little time as possible. In practical use, in one embodiment of the invention the implementation requires about 30 seconds.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A microscope slide coverslip detection apparatus comprising:

(a) a movable stage for mounting a microscope slide having a microscope slide coverslip, where the microscope slide coverslip has microscope slide coverslip edges;

(b) an imaging means for obtaining an image of the microscope slide coverslip;

(c) an image processor means for receiving and processing the image and for automatically detecting and locating the microscope slide coverslip edges and an object wherein the image processor means performs a crossing search and a following search to locate the microscope slide coverslip edges and wherein the image processor means locates corners of the microscope slide coverslip as fiducial marks to define a coordinate system for each slide and wherein the image processor means locates the object relative to the coordinate system; and (d) a light source positioned to illuminate the microscope slide coverslip.

2. The apparatus of claim 1 wherein the image processor means comprises:
 (a) at least one field of view processor connected to the image processor means to process images from the image processor means; and
 (b) a host computer to control the at least one field of view processors.

3. The apparatus of claim 1 where the image processor means searches in a predefined area of the microscope slide coverslip.

4. The apparatus of claim 1 where the image processor means performs at least one morphological operation to generate an edge image.

5. The apparatus of claim 2 wherein the at least one field of view processor performs a 35×1 horizontal dilate, a 1×65 vertical dilate and a 13×1 horizontal closing to generate a thick edge image, a thin edge image and a combined edge image.

6. The apparatus of claim 1 further comprising means for providing a combined edge image; and a means for processing the combined edge image wherein the combined edge image is processed into a filtered edge image.

7. The apparatus of claim 1 wherein the microscope slide further comprises a specimen prepared by the Papanicolaou method.

8. The apparatus of claim 1 wherein the imaging means comprises a CCD camera.

9. The apparatus of claim 1 wherein the light source is a arc lamp.

10. The apparatus of claim 1 wherein the light source is a strobed arc lamp.

11. The apparatus of claim 1 further comprising a means, coupled to the image processor means, for accumulating at least one set of point coordinates from an object of interest on the microscope slide coverslip, wherein the at least one set of point coordinates are fit to a line with a predetermined fit.

12. The apparatus of claim 11 wherein the predetermined fit is a least squares error fit.

13. The apparatus of claim 11 wherein the accumulating means further comprises means for line fitting wherein a plurality of sets of point coordinates are fit with the predetermined fit and one of the plurality of sets of point coordinates that satisfies a predetermined criteria is selected.

14. The apparatus of claim 13 wherein the line fitting means further comprises means for calculating a calculated position of each of the plurality of sets of point coordinates wherein the predetermined fit has a number of points, and wherein the predetermined criteria has a total error defined by a difference substantially equal to a measured position subtracted from the calculated position of each of the plurality of sets of point coordinates, and wherein the total error is normalized by the number of points used in the predetermined fit.

15. The apparatus of claim 1 further comprising a means for checking whether the microscope slide coverslip edges are substantially perpendicular to each other within a predetermined tolerance.

16. The apparatus of claim 1 wherein the image processor means further comprises a plurality of field of view processors to process multiple fields of view.

17. A method of evaluating a microscope slide by measuring a coverslip on the microscope slide, the method comprising the steps of:
 (a) finding a left edge of the coverslip relative to a predetermined window region;
 (b) finding a bottom edge of the coverslip relative to the predetermined window region;
 (c) finding a top edge of the coverslip relative to the predetermined window region;
 (d) finding a right edge of the coverslip relative to the predetermined window region;
 (e) calculating a corner of each intersecting pair of edges by calculating an intersection of adjacent edge pairs;
 (f) determining that each corner is square;
 (g) rejecting the microscope slide if each corner is not square within a predetermined set of limits;
 (h) rejecting the microscope slide if a calculated length of the coverslip is not a multiple of a predetermined distance;
 (i) rejecting the microscope slide if a calculated coverslip width is not within predetermined limits;
 (j) rejecting the microscope slide if a calculated coverslip skew angle is not within predetermined skew limits;
 (k) locating at least one object of interest in relation to the coverslip; and
 (l) using the coverslip as a basis for a coordinate system for locating the at least one object of interest.

18. A method for slide coverslip edge selection for a coverslip mounted on a slide, the method comprising the steps of:
 (a) performing a crossing search on the slide to find an edge;
 (b) doing a following search on the slide to obtain a plurality of candidate edges;
 (c) ranking each one of the plurality of candidate edges according to a predetermined set of criteria;
 (d) selecting at least one candidate edge;
 (e) determining whether the at least one candidate edge qualifies as a coverslip edge when measured against a set of edge qualifications, and if the at least one candidate edge qualifies, accepting the at least one candidate edge, otherwise selecting a next highest ranking edge;
 (f) selecting only edges that qualify as a coverslip edge;
 (g) locating at least one object of interest in relation to the coverslip; and
 (h) using the coverslip as a basis for a coordinate system for locating the at least one object of interest.

19. The method of claim 18 wherein the crossing search further comprises the steps of:
 (a) positioning the slide to view a portion of the slide within a predetermined area of the slide;
 (b) obtaining a second image of the slide after positioning;
 (c) locating edge objects within the predetermined area;
 (d) correlating a plurality of located edge objects over multiple fields of view to produce a correlated edge object; and
 (e) determining if a correlated edge object satisfies a predetermined set of criteria, and if it does determining that a coverslip edge has been found.

20. The method of claim 19 wherein the step of determining if a correlated edge object satisfies a predetermined set of criteria further checking whether the edge objects are substantially perpendicular to each other within a predetermined tolerance.

21. The method of claim 19 wherein step of determining further includes determining whether a detected edge is no more than first distance away from a predetermined edge location.

22. The method of claim 18 wherein the following search comprises the steps of:
   (a) dividing a slide coverslip image into a plurality of unique images of a field of view such that each one of the plurality of unique images contains data elements from a slide coverslip edge;
   (b) determining an object hit for each data element to produce a plurality of object hits; and
   (c) correlating the plurality of object hits in each of the plurality of unique images so as to form a microscope slide coverslip edge image.

23. The method of claim 22 wherein the step of dividing the slide coverslip image further includes the step of filtering the plurality of unique images to provide data elements including filtered edge images.

24. The method of claim 23 wherein the step of filtering includes applying a low pass filter on the data elements.

25. The method of claim 22 further comprising the step of applying a threshold to the data elements wherein the data elements representing the edge are thresholded to determine the object hits.

26. The method of claim 22 further comprising the step of filtering the plurality of unique images with at least one morphological operator to produce a data element having a filtered edge image.

27. The method of claim 26 wherein the at least one morphological operator is selected from a group consisting of erosions, dilations, vertical erosions and vertical dilations.

28. The method of claim 27 comprising the step of dividing the plurality of unique images into a plurality of partial images such that the plurality of partial images each contain a portion of an edge image.

29. The method of claim 28 further including a step of applying a threshold to the filtered edge image, wherein the filtered edge image is thresholded and each occurrence of a region projection exceeding a filtered threshold projection is determined to be an object hit.

* * * * *

UNITED STATES PATENT AND TRADEMARK OFFICE
CERTIFICATE OF CORRECTION

PATENT NO. : 5,812,692
DATED : September 22, 1998
INVENTOR(S) : Rosenlof et al.

It is certified that error appears in the above-identified patent and that said Letters Patent is hereby corrected as shown below:

Column 5, line 23, delete the number "568" and replace it with -- 562 --.

Column 5, line 24, delete the number "568" and replace it with -- 562 --.

Column 7, line 66, delete the word "Perform" and replace it with -- The image processing operation performs --.

Column 7, line 66, delete number "84".

Column 8, line 1, delete the phrase ". Filter" and replace it with -- to filter --.

Column 8, line 60, delete "1x36" and replace it with -- 1x34 --.

Column 8, line 62, delete the first occurrence of the word "step".

Signed and Sealed this

Fifteenth Day of June, 1999

Attest:

Attesting Officer

Q. TODD DICKINSON

Acting Commissioner of Patents and Trademarks